United States Patent
Bai et al.

(10) Patent No.: US 7,493,617 B2
(45) Date of Patent: Feb. 17, 2009

(54) METHOD OF MAINTAINING TASK SEQUENCE WITHIN A TASK DOMAIN ACROSS ERROR RECOVERY

(75) Inventors: Angqin Bai, Tucson, AZ (US); Alex Q. Chen, Tucson, AZ (US); Theodore T. Harris, Jr., Tucson, AZ (US); Carol S. Mellgren, Tucson, AZ (US); Edwin K. Scott, Tucson, AZ (US); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/794,553

(22) Filed: Mar. 5, 2004

(65) Prior Publication Data

US 2005/0198638 A1    Sep. 8, 2005

(51) Int. Cl.
*G06F 9/46* (2006.01)
*G06F 11/00* (2006.01)

(52) U.S. Cl. .......................................... 718/100; 714/2
(58) Field of Classification Search ................. 718/100; 725/134; 711/165; 714/2
See application file for complete search history.

(56) References Cited

U.S. PATENT DOCUMENTS

| | | | |
|---|---|---|---|
| 5,067,104 A | 11/1991 | Krishnakumar et al. | |
| 5,164,928 A * | 11/1992 | Oliver et al. | 369/30.29 |
| 5,727,211 A | 3/1998 | Gulsen | |
| 5,996,086 A | 11/1999 | Delaney et al. | |
| 6,061,711 A | 5/2000 | Song et al. | |
| 6,260,150 B1 | 7/2001 | Diepstraten et al. | |
| 7,013,371 B2 * | 3/2006 | Watanabe et al. | 711/161 |
| 7,263,590 B1 * | 8/2007 | Todd et al. | 711/165 |
| 2003/0106068 A1 * | 6/2003 | Ishida et al. | 725/134 |

OTHER PUBLICATIONS

Castets, G. et al., "IBM TotalStorage Enterprise Storage Server PPRC Extended Distance", *Redbooks*, pp. 7-23, (Jun. 2002).

* cited by examiner

*Primary Examiner*—Meng-Ai An
*Assistant Examiner*—Camquy Truong
(74) *Attorney, Agent, or Firm*—Scully, Scott, Murphy & Presser, P.C.

(57) ABSTRACT

Tracks of data or other data units are copied from a primary storage system to a secondary storage system. For multiple-track or multiple-data unit transfers, a group of tracks or data units which are sequentially related are transferred. A respective task is defined at the primary storage system for monitoring a progress of the transfer of each of the respective data units in a group. A state is maintained for monitoring a progress of the transfer of the group responsive to the progress of each of the tasks. A normal state is selected when there are no failed tasks. A recovery state is selected when there is a failure, and the status of the remaining tasks is being ascertained. A retry state is selected following the recovery state to retry the failed tasks. A failed state indicates an unrecoverable failure.

13 Claims, 3 Drawing Sheets

METHOD OF MAINTAINING TASK SEQUENCE WITHIN A TASK DOMAIN ACROSS ERROR RECOVERY

BACKGROUND OF THE INVENTION

1. Field of the Invention

The invention relates generally to the field of computer systems and, more specifically, to a copying technique where data at a primary storage system is backed up to a secondary storage system.

2. Description of the Related Art

Computer storage systems such as storage servers commonly employ remote backup techniques where secondary storage system such as a server constantly maintains a second copy of data on a primary storage system such as a server. The secondary storage system is typically located remotely from the primary storage system and receives data from the primary storage system via a high-speed link such as an optical fiber link. In other cases, data is backed up between storage systems within the same storage server. Moreover, the data transfers to the secondary storage system may include single-track transfers, where tracks are sent individually, and multi-track transfers, where multiple tracks are broken up into a number of related single-track transfers. The tracks are units of storage on a storage medium such as a disk. For example, the tracks may be rings of disks on which data is stored. Each track can be formatted to contain a number of data records that are sequentially numbered starting with zero. Other types of data transfers are also possible.

With remote copying, such as peer-to-peer remote copying (PPRC) over fibre, there is a design point that tasks in a multi-track transfer must be committed in order, e.g., to accommodate file systems and some applications. There are many applications that can't tolerate holes in their data (e.g., if tracks 1,3,5 were committed but 2,4 were not, then tracks 2 and 4 would contain stale data, and we would have an intermix of good data with stale data). The commit process generally involves storing the received data in non-volatile storage at the secondary storage system, and sending a corresponding confirmation message to the primary storage system. A task refers to one or more sequences of instructions treated by a control program as an element of work to be accomplished by a computer. With remote copying, a task involves sending data from the primary storage system to the secondary storage system, along with commands for storing the data at the secondary storage system. If any of the tasks in a transfer fails, all subsequent tasks in the transfer will also fail. Moreover, even though the transfers are serialized as they are sent, the failure status for the transfers may come back to the primary storage system in any order.

Accordingly, there is a need for a copying technique for retrying failed tasks in order, while also dealing with new transfer requests and additional failures.

BRIEF SUMMARY OF THE INVENTION

To address the above and other issues, the present invention provides a technique for handling errors that may occur during copying tasks where multiple related data units, such as tracks of data, are communicated.

In a particular aspect of the invention, a method for copying data includes initiating transfer of at least one group of data units from a primary storage system to a secondary storage system, defining a respective task for monitoring a progress of the transfer of each of the respective data units, and maintaining a state for monitoring a progress of the transfer of the at least one group, where the state is responsive to a progress of each of the tasks.

A corresponding primary storage system and program storage device may be also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
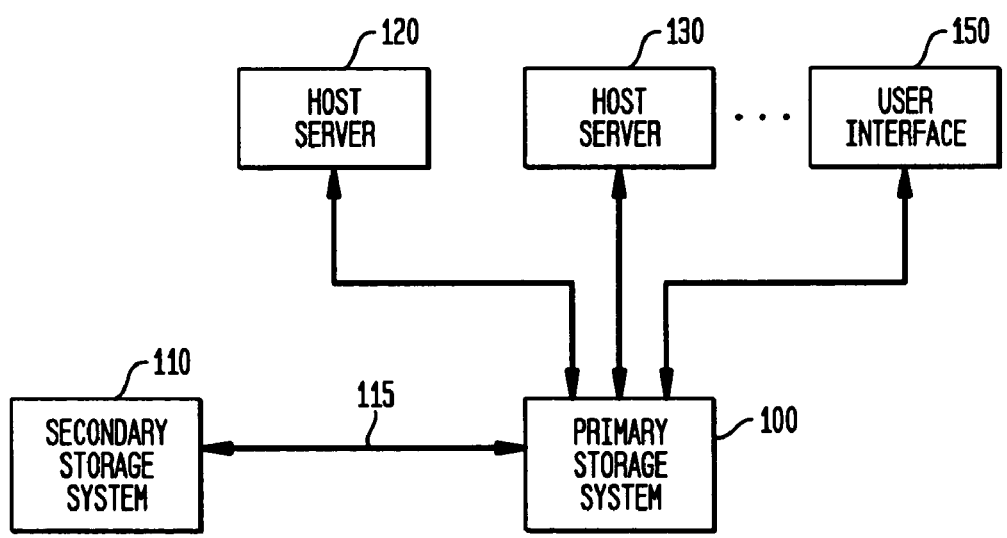
FIG. 1 illustrates an overview of storage systems, hosts, and a user interface in a computer system.

FIG. 1 illustrates an overview of storage systems, hosts, and a user interface in a computer system. Storage systems 100 and 110 may be IBM Enterprise Storage Servers (ESSs), for instance. The storage systems 100 and 110 typically can connect to a variety of host servers, such as host servers 120 and 130, which may be servers that store data for different networks. Periodically, the data on the host servers 120, 130 is backed up to the primary storage system 100 to avoid data loss if the host servers 120, 130 malfunction. The storage systems 100 and 110 may communicate via a path 115 using any type of communication medium and technique. Note that a number of paths may be provided between the storage systems 100 and 110.

The storage system 100 can provide data sharing between host servers since it is accessible to each host server. The storage system 100 itself may have redundant storage resources to provide an additional safeguard against data loss. Using the continual copying techniques discussed further below, data of the primary storage system 100 is mirrored, e.g., copied, to another, secondary storage system, such as storage system 110, which is typically at a remote site. Note that multiple storage systems may also be present at one site, or within one server or other machine, to provide a sufficient backup capability to a group of hosts. A storage system of a particular type, such as one that uses disk storage, may connect to one or more other peer disk storage systems as well as to other storage devices, such as those using magnetic tape. Communication between the devices may be achieved using any desired communication protocol and medium.

Figure 2:
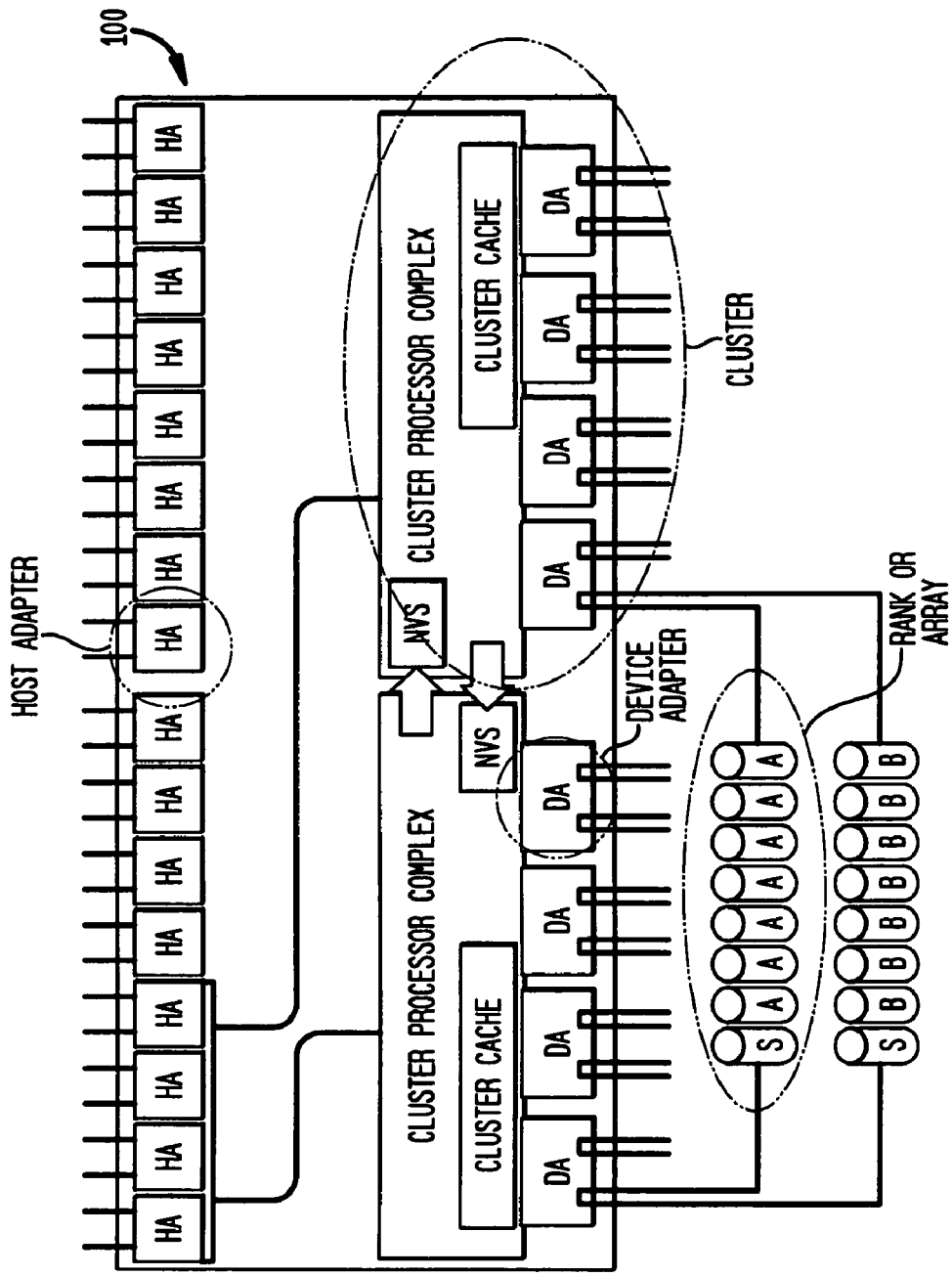
FIG. 2 illustrates an overview of a logical structure of a storage system.

FIG. 2 illustrates an overview of a logical structure of the storage system 100. The example shown relates to the IBM ESS, which includes special features such as redundant storage resources that may not be found in other storage devices. The overview is an example only to show one way in which a storage system may connect to other devices and arrange the storage of data internally. The invention can be used with any storage system. The storage system 100 includes two clusters for redundancy. Each cluster includes a cluster processor complex, a cluster cache, and device adapters to connect disk storage resources to the cluster processor complexes. The cluster processor complexes each work independently. Each may contain symmetric multi processors with (volatile) cache, non-volatile storage/cache (NVS), and device adapters (DA). The device adapters, which are installed in pairs, one in each cluster, are used to connect disks to the cluster processor complexes. Disk arrays or ranks are attached to the two DAs.

The ranks can be configured as RAID 5 (redundant array of independent disks) or non-RAID arrays. In the ranks, "S" indicates a spare disk and "A" and "B" identify the rank.

Host adapters (HAs) are external interfaces which may support one or more ports, either small computer systems interface (SCSI) or IBM's enterprise systems connection (ESCON), which is an Enterprise Systems Architecture/390 and zSeries computer peripheral interface. This I/O interface uses ESA/390 logical protocols over a serial interface that configures attached units to a communication fabric. For example, the remote storage system 110, host servers 120, 130 and the user interface 150 may communicate with the storage system 100 via the HAs. Fibre channel or fibre-channel connection (FICON) has support for one channel per HA. Each HA connects to both cluster processor complexes so that either cluster can handle I/Os from any host adapter. A system adapter identification number (SA/D) is a unique identification number automatically assigned to each HA.

The user interface 150, which may include a workstation with video screen, communicates with the storage system 100 to obtain information regarding the storage resources and the status of copy operations. Additionally, the user interface 150 communicates instructions for setting up source-target pairs of storage resources for copying data, and initiating copying operations.

Processing resources in the storage system 100, such as in the cluster processor complexes or other processor not specifically shown, may maintain information regarding a hierarchy of storage resources. At the first, highest level of the hierarchy is the device level, which may include the storage systems 100 and 110, and the host servers 120 and 130. The second level represents storage resources within a specific device. For example, the storage systems and hosts may have logical subsystems (LSSs), which in turn are comprised of volumes, in the third level of the hierarchy. The LSS is a logical construct that includes a group of logical devices such as logical volumes, which may be units of recording medium associated with a logical disk drive. For example, a logical volume in a RAID array may be spread over the disks in the array. The units may include sectors of one or more disks.

The processing resources in the storage system 100 may continuously monitor the activities of the various storage resources, including whether a resource has been designated as a source resource from which data is copied, or a target resource to which data is copied, which resources are paired in a copy relationship, whether data is currently being read from, or written to, a resource, what type of copying is occurring, which sectors of a disk resource are involved in copying, what percent of the copying has been completed, and whether copying has been temporarily suspended. Information regarding these activities may be tracked using appropriate data constructs in a database that is dynamically updated as the information changes. Information that does not usually change, such as the size and type of the storage resource, can also be maintained.

Moreover, when storage resources external to a single storage device are involved in a copying operation with the primary storage system 100, such as the secondary storage system 110, or host servers 120 and 130, the processing resources in the storage system 100 may communicate with the external devices to obtain analogous information regarding their storage resources.

The various types of copying operations that may occur include point-in-time copying and continual copying. An example of point-in-time copying is IBM's FlashCopy, which provides an instant copy of a volume, e.g., within the storage device 100. This may be used to create test data, temporary checkpoint copies, or for asynchronous backup, or to perform data mining and data warehousing on the copied data. A type of point-in-time copying used on mainframe host computers is IBM's Concurrent Copy. This is a facility on a storage server that enables a program to make a backup of a data set while the logical volume remains available for subsequent processing. The data in the backup copy is frozen at the point-in-time that the server responds to the request.

The invention can be used with any type of continual copying, which includes synchronous and asynchronous mirroring. An example of continual copying is peer-to-peer remote copying (PPRC), which is a synchronous mirroring product, and is typically used as a disaster recovery solution. It maintains a synchronous copy of a logical volume on the same storage server or on another storage server. All modifications that any attached host performs on the primary logical volume are also performed on the secondary logical volume. Peer-to-peer remote copy solutions comprise functionality for enabling direct and synchronous copying of data at the volume level from the primary storage system 100 to the secondary storage system 110. The PPRC solution for direct copying of data is transparent to the operating system of the primary storage system 100 and to any applications running on the primary hosts.

A related type of copying, PPRC extended distance, maintains a fuzzy copy of a logical volume on the same ESS or on another ESS. In other words, all modifications that any attached host performs on the primary logical volume are also performed on the secondary logical volume at a later point in time. The original order of update is not strictly maintained.

Generally, during copying, units of data such as tracks of data are copied from one or more locations such as tracks on one or more disks at the primary storage system 100 to one or more locations such as tracks on one or more disks at the secondary storage system 110. Each data unit can store a fixed amount of data. In one possible example, the IBM ESS "Shark" storage server uses sixty-four 512-byte blocks per track, so thirty-two Kbytes can be stored per track. Other configurations are possible. A block is a group of consecutive bytes used as a basic storage unit in a track. Copying techniques such as PPRC can transfer one track of data at a time from the primary storage system 100 to the secondary storage system 110. PPRC can also transfer a subset of a track, such as a collection of blocks.

When the host 120, 130 writes data to the primary server 100 that does not exceed the capacity of one data unit, and does not cross a data unit boundary, the data is stored in one data unit. Note that the write does not cross a data unit boundary such as a track boundary. For example, if a host wanted to write 32 blocks starting at block 48 in track 0, then the storage system would write the first 16 blocks into track 0, and the remaining 16 blocks into track 1. The data unit can be sent individually from the primary storage system 100 to the secondary storage system 110, without regard to data in other data units, in a single data unit, e.g., single-track, transfer. However, when the host 120, 130 writes data to the primary storage system 100 that exceeds the capacity of one data unit, the data will span over multiple data units. For example, if 96 Kbytes of data from a host are written to the primary storage device 100 starting at a track boundary, the data will be stored in a total of three tracks (96 Kbytes/32 Kbytes/track=3 tracks). Accordingly, a multi-track transfer will be used when this data is copied to the secondary storage system 110, where the data in the multiple tracks is broken up into a number of single-track transfers that are related to each other in a particular sequence, e.g., the data in a first track precedes the data in a second track, which in turn precedes the data in a third track.

The primary storage system 100 executes software that defines a task for monitoring the progress of the copying of an associated data unit such as a track of data from the primary storage system to the secondary storage system 110. A task involves instructions for sending data from the primary storage system 100 to the secondary storage system 110, along with commands for storing the data at the secondary storage system 110, and for monitoring any messages that are received from the secondary storage system 110. When the secondary storage system 110 receives and stores a track of data or other data unit in a commit process, it sends a status message back to the primary storage system 100 indicating that the track has been successfully committed. The track of data or other data unit may be stored initially in cluster cache at the secondary storage system 110 and subsequently destaged to disk, at which time the data is considered to be committed since it cannot be lost. The primary and secondary storage systems may each have memory, or program storage devices, for storing the software that is executed by respective controls to achieve the functionality described herein. Creation of such software and the use of other hardware, firmware, and software techniques and devices as needed is believed to be within the purview of those of ordinary skill in the art.

When the secondary storage system 110 sends a message to the primary storage system 100 informing it that a data unit has been committed, the primary storage system can note that the task associated with the data unit has been successfully completed. However, the secondary storage system 110 may send other messages to the primary storage system 100 indicating, e.g., that the secondary storage system is malfunctioning and cannot store data from the primary storage system. A message may indicate that maintenance is being performed, or there are software contention issues, or the secondary storage system 110 is too busy to accept data. Furthermore, the primary storage system 100 may track the progress of the tasks by maintaining a time limit to complete task, so that a failure is declared if the task is not completed within the time limit. Thus, a task can be unsuccessful in its objective of copying the associated data unit to the secondary storage system 110 for various reasons, including problems at the secondary storage system 110, along the link 115, or at the primary storage system 100.

In accordance with the invention, the tasks that are associated with a multi-track or other multi-data unit transfer are grouped in a "context" or group that monitors the progress of the copying according to the progress of each task. A context can contain any number of tasks. Multiple groups or contexts can exist at the same time when multiple multi-track or other multi-unit data transfers are attempted. If any of the tasks fail, all subsequent tasks will also fail, because the data units must be committed in order at the secondary server. Moreover, even though the transfers are serialized as they are sent, the failure status for the transfers may come back to the primary storage system in any order. The invention addresses these problems by providing a copying technique for retrying failed tasks in order, while also dealing with new transfer requests and additional failures.

A context involves grouping of tasks. The primary storage system 100 maintains information regarding one or more contexts, including a context state, a context retry queue, and an active track count. Individual tasks that are part of a context will carry information identifying the context they belong to and their relative position in the context, e.g., first, second, third, etc. A task's position in the context, and consequently the relative position of the associated data unit, may be defined by a sequence number that will increment for each new task belonging to the context. With this information, we can determine how to retry a context when there are failures. The invention thus provides error recovery for a high-performance method of sending multiple tracks, rather than simply sending one track, waiting for it to complete, then sending the next track, and so forth. That is, the primary storage system 100 could choose to send one track (say Track A) at a time. The primary storage system 100 would have to wait for Track A to complete (i.e., receive a good status from the secondary storage system 110) before it could continue transferring the next track, say Track B. This approach is inefficient since only one track is sent at a time. The invention overcomes this problem by monitoring the status of multiple tracks at a time.

Figure 3:
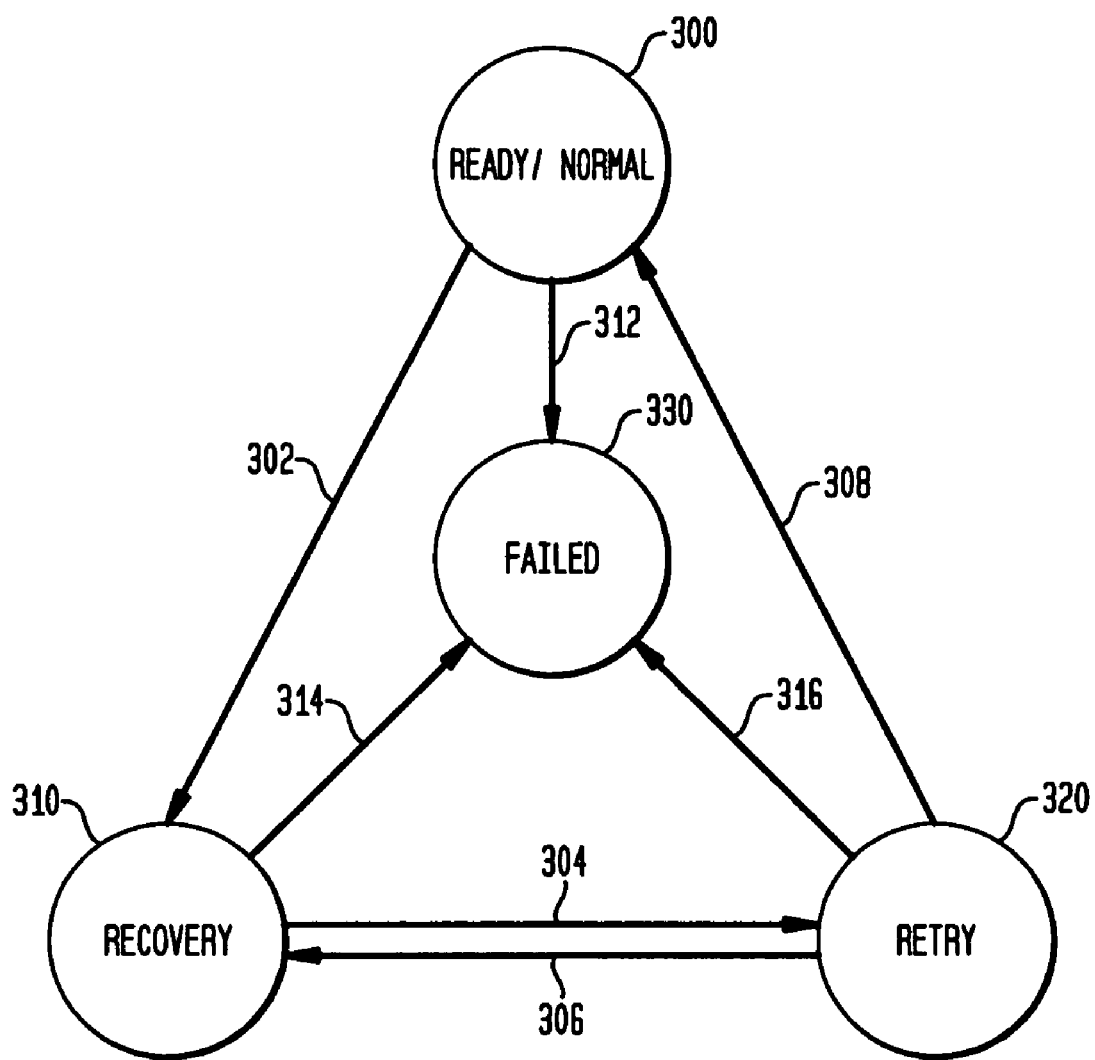
FIG. 3 illustrates a state diagram for a group or context of data copying tasks.

FIG. 3 illustrates a state diagram for a group or context of data copying tasks. In one possible implementation, we define four context states to represent what stage a context is in. The states include a normal/ready state 300, a recovery state 310, a retry state 320, and a failed state 330. The transitions between the states are also indicated by arrows. In the normal/ready state 300, the context is ready to transmit new tasks, or is currently transmitting tasks and none of the tasks in the context has failed unrecoverably in transferring the associated data unit from the primary storage system to the secondary storage system. That is, the context has not had an unrecoverable failure in any of its tasks, or it has recovered from any recoverable failure that did occur. A recoverable failure may include, e.g., a timeout, a link problem (switch dropped a frame), or the secondary storage system 110 being too busy to process the request. An unrecoverable failure may include, e.g., a disk format problem on the secondary storage system 110, a disk hardware problem on the secondary, or exhausting all retries.

The recovery state 310 is selected when the context has had a recoverable failure in any of its tasks, but is not yet ready to retry the failed task. In this case, the context must ascertain the status of the other tasks that have not failed, before attempting to retry the failed task. Thus, the recovery state 310 is selected when the primary storage system does not yet know if the one or more remaining tasks have been successful in transferring the associated data unit from the primary storage system to the secondary storage system. The retry state 320 is selected when the context has had a recoverable failure in any of its tasks and is retrying the one or more failed tasks. The failed state is selected when one or more of the tasks in a context have had an unrecoverable failure.

Referring to the various transitions between the states, transition 302 occurs when the context has had a recoverable failure, and it is necessary to wait for all outstanding tasks to check back in with the primary storage system. We expect the remaining tasks to return as failed. The recovery state 310 is maintained until the status of the other tasks that have not failed has been ascertained. Transition 304 occurs when all tasks have checked in, and there are no other failures, and we can now start to retry the failed tasks in the context by transitioning to the retry state 320. Transition 306 occurs when a recoverable failure occurs when in the retry state 320, and we must again wait for all tasks to check back in to be sure there are no other failures. Transition 308 occurs when we have retried all tasks that previously failed, and we can now return to the normal state 300. Transition 312, 314 and 316 occur when the context has an unrecoverable error. The context state is changed to the failed state 330 to represent that nothing further can be done with the context.

Regarding the context retry queue discussed above, the primary storage system 100 may maintain a queue of tasks for which a retry attempt is waiting to be made, on a per context basis.

Regarding the active track count (ATC) discussed above, this involves maintaining a count of the number of tracks or other data units on a per context basis that have not yet been completed. Alternatively, a count of the active tasks may be maintained. These are tasks that are associated with active data units. This information may be used by the primary storage system 100, e.g., in allocating resources to the tasks.

The context retry queue and active track count are both on a per context basis. So, each context carries its own retry queue and active track count. The context retry queue contains all the tasks (tracks) that failed and are waiting to be retried. The active track count is the total number of tasks that have been sent for which we have not received a status, either good or bad.

Table 1 describes how we may choose to deal with tasks based on: 1) the context state, 2) the active track count (whether we have outstanding tasks), and 3) whether the task is new or not (e.g., is this the first time we've tried to transfer the task, or is it a retry?). Regarding the entry that states "The context has outstanding tasks so we must send this task down the same path", the path refers to a communication path between the primary and secondary storage systems. The path may include, for example, the port used by the primary storage system 100 to send a data unit, and the port used by the secondary storage system to receive the data unit, as well as the path configured in a switching fabric of a network, such as in routers. If the data units of different tasks in a context were sent on different paths, a race condition could occur if they arrived at the secondary storage system 110 out of order. Regarding the entry that states "The context has no outstanding task so go through port selection" port selection refers to selecting a port such as a host adapter at the primary storage system 100 through which a data unit will be sent. "N/A" means "not applicable".

TABLE 1

| Context State | Active track count | New Task/ Old Task | Action | Meaning |
|---|---|---|---|---|
| RETRY | >0 | New | Queue on Context Retry Queue | The context is currently retrying so put the new task on the end of the context retry queue. |
| | >0 | Old | Process with existing port info | This is the next task from the context retry queue. |
| | =0 | New | Queue on Context Retry Queue | The context must have just transitioned to Retry. Put the new task on the context retry queue. |
| | =0 | Old | Process with new port | This must be the head of the context retry queue. |
| RECOVERY | >0 | New | Queue on Context Retry Queue | We need to wait for all outstanding tasks to check back in. Queue the task. |
| | >0 | Old | Queue on Context Retry Queue | We need to wait for all outstanding tasks to check back in. Queue the task. |
| | =0 | New | Queue on Context Retry Queue | If we are in Recovery and ATC = 0, then we are about to transition to Retry. Put the task on the Queue. (This is a small window) |
| | =0 | Old | N/A | N/A |
| FAILED | >0 | New | Fail task | The context had a hard failure. Fail this task. |
| | >0 | Old | Fail task | The context had a hard failure. Fail this task. |
| | =0 | New | Fail task | The context had a hard failure. Fail this task. |
| | =0 | Old | Fail task | The context had a hard failure. Fail this task. |
| READY/ NORMAL | >0 | New | Process with existing port info | The context has outstanding tasks so we must send this task down the same path. |
| | >0 | Old | N/A | N/A |
| | =0 | New | Process with new port | The context has no outstanding task so go through port selection. |
| | =0 | Old | N/A | N/A |

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for copying data, comprising:

initiating transfer of at least one group of data units from a primary storage system to a secondary storage system, said group of data units having a plurality of data units that are to be transferred;

defining a respective task for monitoring a progress of the transfer of each of the respective data units; and maintaining a plurality of states for monitoring a progress of the transfer of said plurality of data units in the at least one group, said plurality of states comprising at least a normal state indicating that a data unit in the plurality of data units is ready to be transmitted, a recovery state to which a task associated with a data unit transitions if the data unit had a recoverable failure but is not yet ready to retry, a retry state to which the task associated with a data unit transitions when status of all other data units in the plurality of data units is ascertained, and a failed state to which the task associated with a data unit transitions if the data unit had an unrecoverable failure;

wherein the states allow for error recovery of sending multiple data units;

wherein each of the units of data comprises a track of data;

the transfer of at least one group comprises a multi-track transfer;

wherein transfer of a plurality of groups of data units from the primary storage system to the secondary storage system is initiated;

a respective task is defined for monitoring a process of the transfer of each of the respective data units in the plurality of groups;

a state is maintained for monitoring a process of the transfer of each of the groups;

for each of the groups, the state thereof is responsive to the process of each of the tasks thereof; and maintaining data associating each of the tasks with its associated group.

2. The method of claim 1, wherein:

the primary storage system and the secondary storage system are located within the same storage server.

3. The method of claim 1, wherein:

the primary storage system and the secondary storage system comprise respective storage servers that are located remotely from one another.

4. The method of claim 1, further comprising:

maintaining data associated with each of the tasks indicating a sequential position of the associated data unit within the at least one group.

5. The method of claim 1, wherein:

the normal state is selected when none of the tasks has failed unrecoverably in transferring the associated data unit from the primary storage system to the secondary storage system.

6. The method of claim 1, further including:

transitioning to the recovery state when at least one of the tasks has failed recoverably in transferring the associated data unit from the primary storage system to the secondary storage system, and the progress of at least one remaining one of the tasks is being ascertained.

7. The method of claim 1, further including:

transitioning to the retry state when status of all other data units in the plurality of data units being transferred is ascertained and a retry attempt is being made, for at least one of the tasks that has failed recoverably in transferring the associated data unit from the primary storage system to the secondary storage system.

8. The method of claim 1, further including:

transitioning to the failed state is selected when at least one of the tasks has failed unrecoverably in transferring the associated data unit from the primary storage system to the secondary storage system.

9. The method of claim 1, further comprising:

maintaining a count, for each of the groups, of a number of the associated tasks that are active.

10. The method of claim 9, wherein:

the associated tasks are active when the transfer of the associated data unit has not yet been completed.

11. The method of claim 1, further comprising:

maintaining data indicating a sequential position of the data units within the associated group.

12. The method of claim 1, further comprising:

maintaining a queue of the groups for which a retry attempt is waiting to be made, for at least one of the associated tasks that has failed recoverably, to transfer the associated data unit from the primary storage system to the secondary storage system.

13. The method of claim 1, wherein:

the data units are transferred from the primary storage system to the secondary storage system in order.

* * * * *